UNITED STATES PATENT OFFICE 2,221,418

THIODIGLYCOL-POLYCARBOXYLIC ACID CONDENSATION PRODUCTS

Adolf Weihe, Bad Soden, Taunus, Germany, assignor, by mesne assignments, to General Aniline & Film Corporation, New York, N. Y., a corporation of Delaware No Drawing. Application November 18, 1937, Serial No. 175,275. In Germany November 24, 1936

4 Claims. (Cl. 260—75)

The present invention relates to condensation products containing sulfur and to a process of preparing them.

I have found that viscous to caoutchouc-like products may be obtained by the condensation of thiodiglycols of the general formula $$HO-R_1-S_x-R_2-OH$$

wherein $R_1$ and $R_2$ stand for aliphatic hydrocarbon radicals and $x$ stands for one of the numbers 1, 2 and 3, with aliphatic dicarboxylic acids and polycarboxylic acids, especially with the anhydrides and esters thereof.

The condensation products which, as regards their external appearance, are most similar to caoutchouc are those the alcoholic component of which contains 2 sulfur atoms and hydrocarbon chains with 3 to 4 carbon atoms and the acid component of which is unsaturated.

As thioalcohols there may, for instance, be used:

Thiodiethyleneglycol
$$HO-CH_2-CH_2-S-CH_2-CH_2-OH$$
Dithiodiethyleneglycol
$$HO-CH_2-CH_2-S-S-CH_2-CH_2-OH$$
Trithiodiethyleneglycol
$$HO-CH_2-CH_2-S-S-S-CH_2-CH_2-OH$$

Thiodipropyleneglycol, dithiodipropyleneglycol and trithiodipropyleneglycol, thiodibutyleneglycol, dithiodibutyleneglycol and trithiodibutyleneglycol, especially the dithiodibutyleneglycol of the formula $$HO-CH_2-CH_2-CH_2-CH_2-S-$$
$$S-CH_2-CH_2-CH_2-CH_2-OH$$

furthermore dithiodihexyleneglycol, obtainable from the chlorohydrin, corresponding to the hexane-1:6-diol, by the action of 1 mol of $Na_2S_2$.

As acids or the derivatives thereof there may be used maleic acid, malonic acid, succinic acid, adipinic acid, pimelic acid, malic acid, tartaric acid, citric acid, phthalic acid, naphthalic acid, and the anhydrides thereof as far as they may industrially be obtained, and the esters, for instance, the methyl esters, the ethyl esters, the propyl esters, the butyl esters.

Industrially valuable products may likewise be obtained by using highly polymeric carboxylic acids such as polyacrylic acid and highly polymeric hydroxy-carboxylic acids such as the saponification product of the mixed polymerizates from vinyl chloride with maleic anhydride, or of the mixed polymerizate from organic vinyl esters with maleic anhydride.

The condensation may be carried out by heating the components in equimolecular proportions, but one of the components may likewise be used in excess. As reaction temperatures there may be applied temperatures of about 110° C. to about 250° C.

The condensation products thus obtained are yellow or brown, viscous to solid masses which are insoluble in water and in all organic solvents, such as chlorinated hydrocarbons, alcohols, esters, benzene, benzine, ketones. As far as they are solid they may be worked up on a roller like caoutchouc and may be mixed with soot, filling agents and softening agents. Furthermore, they may readily be homogenized with caoutchouc and the synthetic butadiene polymerizates as well as with mixed polymerizates of the butadiene, so that they may be used as extenders for the latter or for altering their properties. Furthermore, they may be used for the preparation of oil-resistant luting materials, textile coatings, hoses and floor covering. The good ageing stability of the new products may especially be noticed.

When unsaturated dicarboxylic acids are used the condensation products may be vulcanized.

The following examples serve to illustrate the invention but they are not intended to limit it thereto:

(1) 210 grams of dithiodibutylene-glycol (1 mol) are intimately mixed with 98 grams of maleic anhydride (1 mol) and the mixture is gradually heated to 160° C., while stirring. First a freely mobile molten mass is formed, which, however, gradually becomes viscous and finally solid. This mass is kept for 7 hours at 160° C. and then heated to 170° C. for 1 hour in order to finish the reaction.

The condensation product obtained is an elastic mass incapable of being melted which on boiling with water remains unchanged and shows a neutral reaction. The product is insoluble in the usual solvents and mixtures of motor fuel.

(2) 210 grams of dithiodibutylene-glycol are dissolved in 750 cc. of xylene and 100 grams of succinic anhydride are added to this solution. The whole is heated to boiling for 2 hours in a reflux apparatus. The product of the reaction gradually collects at the bottom of the vessel in the form of an insoluble balsam.

The xylene is drawn off and the balsam is freed from the adhering solvent with the application of heat.

(3) 242 grams of trithiodibutylene-glycol (1 mol) are mixed with 100 grams of maleic anhydride and the mixture is melted, while stirring, as described in Example 1.

After the fused mass has been heated for 6 hours to 160° C. there is obtained a viscous elastic mass which has nearly the same properties as the product obtained as described in Example 1 but is essentially harder.

(4) 186 grams of trithiodiethylene-glycol (1 mol) are mixed with 98 grams of maleic anhydride. The mixture is heated to 140° C., while stirring, and the molten mass obtained is kept at this temperature for 5 hours.

First the mass is thinly liquid, then becomes viscous and towards the end of the reaction which occurs with evolution of steam, it becomes solid.

The product is similar to that obtained as described in Example 1 but it is less elastic. It has a more resinous character.

(5) 100 parts of the saponified mixed polymerisation product of equimolecular quantities of vinyl chloride and maleic acid dimethyl ester are mixed in a kneader, while heating to 90° C., with 140 parts of trithiodiglycol and 10 parts of di-ortho-tolylguanidine. A mass resembling caoutchouc substitute is obtained which may be worked up on the roller to an elastic film. In a tube press hoses may be prepared from the mass which are completely stable to aromatic and aliphatic hydrocarbons.

Even when maintained at 100° C. the product remains unchanged.

I claim:

1. The condensation products of a compound of the group consisting of unsaturated dicarboxylic acids and their anhydrides, with a compound of the general formula $$HO-R_1-S_x-R_2-OH$$

wherein $R_1$ and $R_2$ stand for aliphatic hydrocarbon radicals and $x$ stands for one of the numbers 1, 2 and 3, said products being viscous to solid, yellow to brown masses, insoluble in water and organic solvents.

2. The condensation products of about 1 mol of a compound of the group consisting of unsaturated dicarboxylic acids and their anhydrides, with about 1 mol of a compound of the general formula $$HO-R_1-S_x-R_2-OH$$

wherein $R_1$ and $R_2$ stand for aliphatic hydrocarbon radicals and $x$ stands for one of the numbers 1, 2 and 3, said products being viscous to solid, yellow to brown masses, insoluble in water and organic solvents.

3. The condensation product of 1 mol of maleic anhydride with 1 mol of dithiodibutylene-glycol, said product being an elastic mass incapable of being melted, inert to boiling water and insoluble in the usual solvents and mixtures of motor fuel.

4. The condensation product of 1 mol of maleic anhydride and 1 mol of trithiodibutylene-glycol, said product being a viscous, elastic mass, inert to boiling water and insoluble in the usual solvents and mixtures of motor fuel.

ADOLF WEIHE.